United States Patent [19]

Currie

[11] Patent Number: 5,166,905
[45] Date of Patent: Nov. 24, 1992

[54] MEANS AND METHOD FOR DYNAMICALLY LOCATING POSITIONS ON A MARINE SEISMIC STREAMER CABLE

[75] Inventor: William S. Currie, Navasota, Tex.

[73] Assignee: Texaco Inc., White Plains, N.Y.

[21] Appl. No.: 779,654

[22] Filed: Oct. 21, 1991

[51] Int. Cl.$^5$ ............................ G01V 1/28; G01V 1/38
[52] U.S. Cl. ......................................... 367/19; 267/23; 267/41; 364/421
[58] Field of Search ......................... 367/19, 20, 23, 41, 367/124–125, 127, 129; 181/110; 364/421

[56] References Cited

U.S. PATENT DOCUMENTS

| | | | |
|---|---|---|---|
| 4,087,780 | 5/1978 | Itria et al. | 367/19 |
| 4,780,856 | 10/1988 | Becquey | 367/33 |
| 4,845,686 | 7/1991 | Broc | 367/19 |
| 4,862,422 | 8/1989 | Broc | 367/19 |
| 4,992,990 | 2/1991 | Langeland et al. | 367/19 |

FOREIGN PATENT DOCUMENTS

| | | | |
|---|---|---|---|
| 2731044 | 1/1979 | Fed. Rep. of Germany | 367/19 |
| 1376052 | 2/1988 | U.S.S.R. | 367/23 |
| 2179737 | 3/1987 | United Kingdom | 367/23 |

OTHER PUBLICATIONS

Cenningham, A. B., "Some Alternate Vibrates Signals"; Dec. 1979, Gegrbysics, vol. 44, #12, pp. 1901–1914.

Primary Examiner—Nelson Moskowitz
Attorney, Agent, or Firm—Robert A. Kulason; James J. O'Loughlin; Ronald G. Gillespie

[57] ABSTRACT

A marine seismic system includes a streamer cable which is towed by a vessel in a body of water. The streamer cable includes a plurality of hydrophones located at predetermined positions in the streamer cable which receives vibrations resulting from a seismic event occurring in the water, and provides signals corresponding to the received vibrations. The streamer cable also includes a plurality of receivers located at predetermined position in the streamer cable. Each receiver receives acoustical signals provided by acoustical sources and provide electrical signals corresponding to the received acoustical signals. A seismic event source provides a seismic event in the water. A plurality of acoustical sources cooperating with the seismic event source also provides encoded acoustical signals into the water when the seismic event source provides a seismic event. Seismic data processing apparatus processes the signals from the hydrophones and the receivers to provide seismic data of an earth formation below the water.

20 Claims, 3 Drawing Sheets

MEANS AND METHOD FOR DYNAMICALLY LOCATING POSITIONS ON A MARINE SEISMIC STREAMER CABLE

BACKGROUND OF THE INVENTION

1. Field of the Invention

The present invention relates to seismic methods in general and, more particularly, to marine seismic methods.

SUMMARY OF THE INVENTION

A marine seismic system includes a streamer cable which is towed by a vessel in a body of water. The streamer cable includes a plurality of hydrophones located at predetermined positions in the streamer cable which receives vibrations resulting from a seismic event occurring in the water, and provides signals corresponding to the received vibrations. The streamer cable also includes a plurality of receivers located at predetermined position in the streamer cable. Each receiver receives acoustical signals provided by acoustical sources and provide electrical signals corresponding to the received acoustical signals. A seismic event source provides a seismic event in the water. A plurality of acoustical sources cooperating with the seismic event source also provides encoded acoustical signals into the water. Seismic data processing apparatus processes the signals recorded from the hydrophones and the receivers to provide seismic data of an earth formation below the water.

The objects and advantages of the invention will appear more fully hereinafter, from a consideration of the detailed description which follows, taken together with the accompanying drawings wherein one embodiment is illustrated by way of example. It is to be expressly understood, however, that the drawings are for illustrative purposes only, and are not to be construed as defining the limits of the invention.

DESCRIPTION OF THE INVENTION

Figure 1:
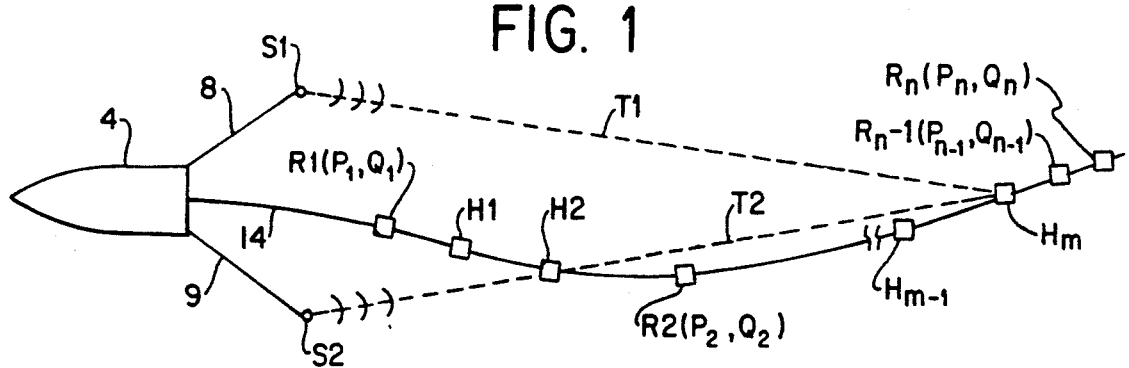
FIG. 1 depicts a ship towing a marine cable carrying receivers and hydrophones.

A marine seismic streamer cable contains arrangements of hydrophones by which seismic signals reflecting from subsurface strata are acquired from detectors placed at intervals along the cable. The positions of the detectors must be known to within a few feet to insure that seismic data processing methods produce accurate maps of subsurface conditions. When the streamer is deployed under ideal conditions a fixed distance behind the towing vessel and towed in a straight line coincident with linear direction of travel of the vessel, the positions of the detectors are known.

Ideal conditions do not always prevail. Consequently, the tow often assumes a distorted path, making detector positions difficult to accurately determine, since the curvature along the streamer can change with variable tow conditions (wind, tide, towing speed, etc.).

When a single streamer is deployed in ideal or close to ideal conditions small position deviations are ignored. When the streamer is distorted to a large degree, estimates of the detector positions are made, and corrections are applied that adjust the seismic data to conform to the ideal tow situation. However, detector positions are usually not known with enough accuracy to guarantee good estimates of the necessary corrections.

One practice used in acquisition of marine seismic data is to intentionally tow the streamer so that the detectors are not in a straight line. Not having detectors in a straight line is a necessary criterion for seismic data processing in three dimensions. Processing the data collected in this manner requires that accurate detector positions be known each time the seismic source is activated, which occurs about four times per minute. When the tow varies from the assumed path, errors are introduced that can adversely alter the results obtained from the seismic data being collected.

Towing multiple streamers is a more efficient means for gathering 3-D seismic data and is now common practice. When data are acquired in this manner, accurate position of detectors is essential to data processing results.

Presently, the industry uses, in some instances, compasses spaced along the streamer which provides estimates of the location of the seismic detectors. The present invention provides highly accurate information related to location of the seismic detectors. This information may be in the form of signals which can incorporate into every day seismic signal processing or may be provided in the format of a seismogram or both.

The present invention envisions being used in cooperation with a seismic event i.e., the firing of air guns or water guns, and the acquisition of the subsequent waves produced by the seismic event. The sources and receivers referred to hereinafter are dedicated to the practice of the present invention. The receivers would be located in the streamer cable(s) containing the hydrophones used in the data acquisition. The sources may be fired as part of the seismic event or as needed to determine the position of each receiver along the streamer cable from which the cable shape can be derived.

Referring now to FIG. 1 by way of explanation, two acoustic sources S1 and S2 are towed through a body of water by a towing vessel 4 with lines 8 and 9, respectively. Vessel 4 also tows a seismic streamer cable 14 having hydrophones H1 through $H_m$ and receivers R1 through $R_n$. Sources S1, S2 are pulsed by conventional means located on vessel 4 at the time of the seismic event or at some other known time, so as to provide acoustical pulses in the water. The travel time from each source of sources S1, S2 to receivers R1 through $R_n$ is measured by observing the reception at each receiver of receivers R1 through $R_n$, noting the time at which each signal is received. For each receiver, of receivers R1 through $R_n$, the time difference between the time sources S1, S2 are pulsed and the time of reception by the receiver is the travel time from each source of sources S1, S2 to the receiver.

The notation "selected receiver $R_s$," is applicable to any receiver of receivers R1 through $R_n$.

Figure 2:
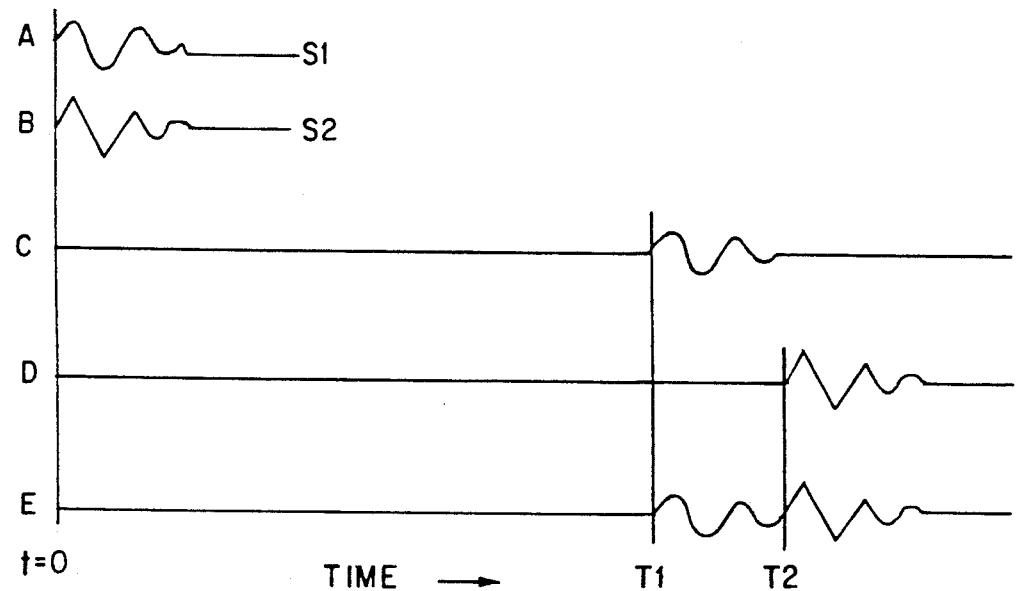
FIG. 2A through 2E represents wave forms to explain the present invention.

FIGS. 2A through 2E illustrate the basic principle and FIGS. 2A, 2B show the waveforms signals provided by sources S1 and S2, respectively. Notice the difference in form. FIG. 2C represents the S1 generated signal being received by a particular receiver of receivers R1 through $R_n$ starting at time t1. That receiver receives the S2 generated signal starting at time t2 indicating that signal S2 had longer distance to travel a shown in FIG. 2D. The combined signal received by the receiver is shown in FIG. 2E.

Figure 3:
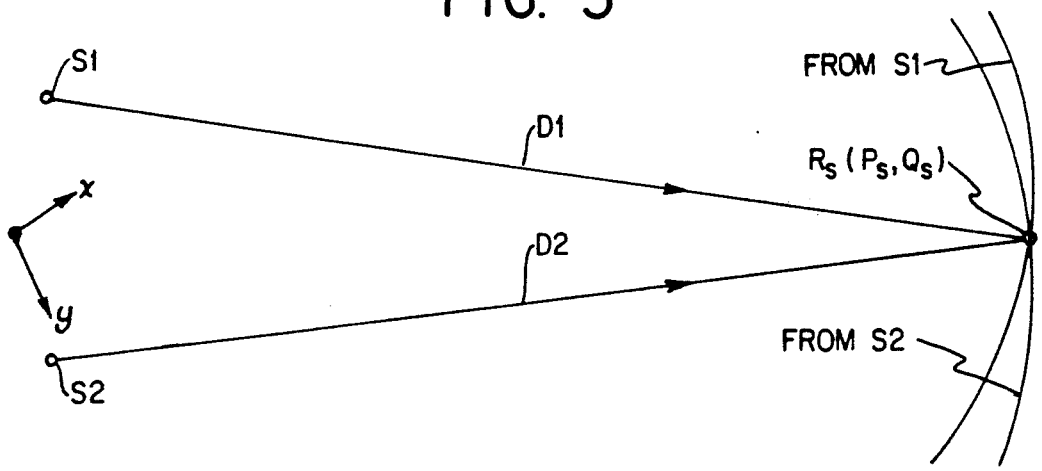
FIG. 3 is graphical representation of how the relationship of the sources and receiver shown in FIG. 1 interact during the practice of the present invention.

With reference to FIG. 3, if the acoustic velocity, speed of sound in water is known, the distances D1, D2 from sources S1 and S2, respectively, to the selected receiver $R_s$ can be determined by multiplying the velocity by the travel times. The distances D1, D2 from selected receiver $R_s$ to sources S1 and S2, respectively may be used to geometrically locate the position of selected receiver $R_s$ by intersecting two circles. One circle has source S1 at its center, the other circle has source S2 at its center. The total signal being contaminated with noise.

The Galois sequences utilized in this invention are fully disclosed and described in U.S. Pat. No. 4,969,129 which is assigned to Texaco Inc., assignee of the present invention. The aforementioned U.S. patent is hereby incorporated into the present disclosure to the extent necessary for one skilled in the art to practice the present invention. The Galois sequences are used in coding the sources S1, S2 which aids in making them identifiable.

Figure 4:
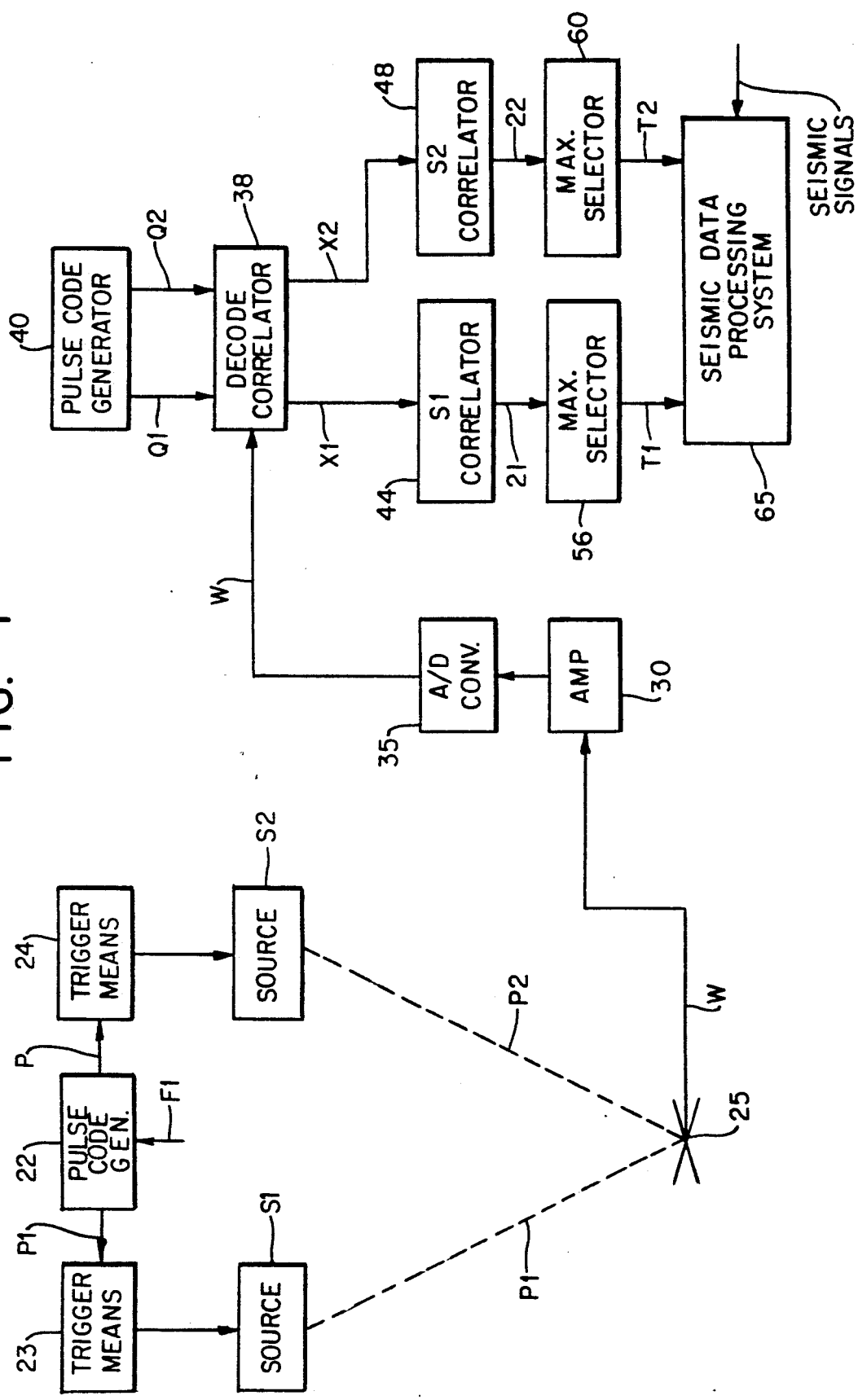
FIG. 4 is a simplified block diagram of a system constructed in accordance with the present invention.

Referring now to FIG. 4, when a seismic event takes place, the firing signal F1 is also provided to pulse code generator 22 which provide pulse code signals p1 and p2 to trigger means 23 and 24, respectively. It should be noted that the present invention may be used independently of the seismic event by providing another pulse to pulse code generator 22 in lieu of firing signal F1. Trigger means 23 and 24 causes sources S1 and S2 respectively, to provide the acoustical signals P1 and P2, respectively. As each receiver receives the acoustical signals, it provides a corresponding signal W to an amplifier 30. Amplifier 30 amplifies signal W and provides to an analog to digital converter 35 where it is converted to a digital signal W. Digital signal W is provided to a decode correlator 38.

Meanwhile, a pulse code generator 40 provides pulse coded signals Q1 and Q2 to decode correlator 38. Decode correlator 38 decodes signal W to provide signals X1 and X2 to correlators 44 and 48, respectively. Correlator 44 and 48, provide signals Z1 and Z2, respectively to max selectors 56 and 60, respectively. Max selectors 56, 60 are responsive to the maximum amplitude of signals Z1 and Z2 to provide signals T1 and T2, respectively. Signals T1, T2 are provided to a seismic data processing system 65 which is receiving seismic signals from the hydrophones in streamer cable 14. Seismic data processing system 65 then utilizes the signals T1 and T2 in determining the location of each receiver R1 through $R_n$ and utilizes that information in the processing of the seismic signals.

Figure 5:
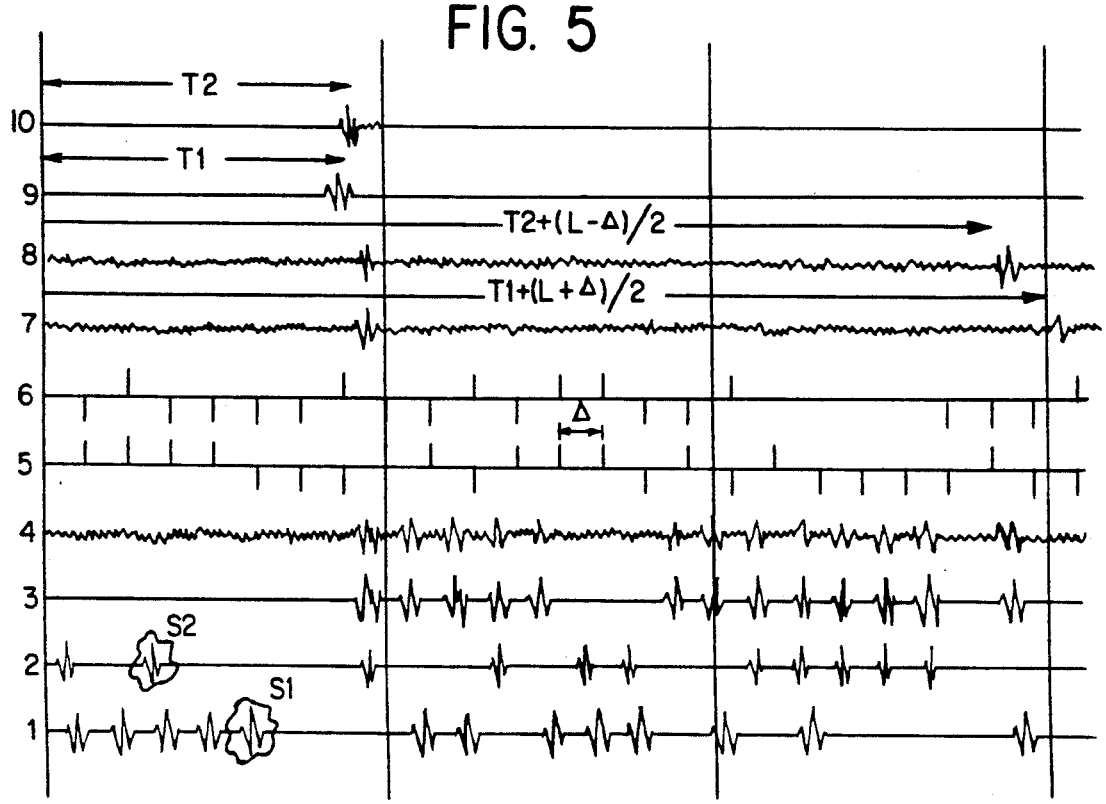
FIG. 5 is a seismogram representation of signals relating to the sources and receivers as might exist in the practice of the present invention.

Again as an aid in explanation and with reference to FIGS. 4 and 5, there is shown a portion of a seismogram having 10 traces in FIG. 5, which are numbered 1 through 10 on the left hand margin of the seismogram. Trace 1 corresponds to acoustic signal P1 and results from the convolution of the source S1 with the coded pulse signal p1 from a pulse code generator 8. The convolution is performed by trigger means 23 triggering source S1. Similarly, trace 2, corresponding to a seismic acoustic signal P2, which is the convoluted signal resulting from the convolution of source S2 with a pulse signal p2 utilizing trigger means 24. Trace 3 represents the following equation (1):

$$Y = P1(t-T1) + P2(t-T2) \qquad (1)$$

where P1, P2 are acoustic signals from sources S1 and S2, respectively. Trace 4 represents the received signal W which is trace 3 with noise, i.e. W=Y+noise. Traces 5 and 6 represent signals Q1 and Q2, respectively, from a pulse code generator 40. Trace 7 represents signal X1 and is the correlation of signal Q1 with signal W. Similarly, trace 8 corresponds to signal X2 and is the correlation of signal Q2 with signal W. The correlation of signal W with signals Q1 and Q2 is accomplished with decode correlator 38.

Trace 9 relates to signal Z1, which is source S1 signal correlated with signal X1 by an S1 correlator 44. Trace 10 is representative of signal Z2, which is source SI signal [P2] correlated with signal X2 using an S2 correlator 48. Max. selectors 56, 60 provide times T1, T2 in accordance with signals Z1 and Z2, respectively. There is annotated on the seismogram of FIG. 4 the occurrence of source signal S1 in trace 1 and the occurrence of source signal S1 in trace 2. Trace 5 has annotated on it "Δ" which is the minimum distance in time between pulses. The letter "L", as marked on trace 6, is the period of reoccurrence and is defined in the following equation (2):

$$L = (2^m - 1)\Delta, \text{ m being the order of the Galois sequence employed.} \qquad (2)$$

In this example order m is 5, thus L equals 31 Δ which can be seen by counting the pulses in traces 5 and 6. The annotations "T1+(L+Δ)/2" and "T2+(L−Δ)/2" are noted on traces 7 and 8, respectively, and represent respectively the times at which signal S2 occurs in F1 and signal S1 occurs in F2, making apparent to one skilled in the art that the invention can be implemented using a single decode correlator.

To summarize FIG. 4, signals from S1 and S2 are received by the receivers in a streamer cable and through conventional data processing methods are provided internally which shows up as traces 9 and 10 of FIG. 4. With time T1 and T2 known seismic data equipment determines the location of the receivers located throughout the streamer cable and thus, can determine the location of the hydrophones in the streamer cable using equation (3), so as to more accurately process the seismic data.

$$(vt_i)^2 = (P - A_i)^2 + (Q - B_i)^2, \text{ for } i=1,2, \qquad (3)$$

where $(P_s, Q_s)$ is the location of received $R_s$ referenced to the known position of a horizontal (x,y) coordinate system as indicated in FIG. 3, $P_s$ being the x coordinate of receiver $R_s$ and $Q_s$ being the y coordinate of receiver $R_s$.

Figure 6:
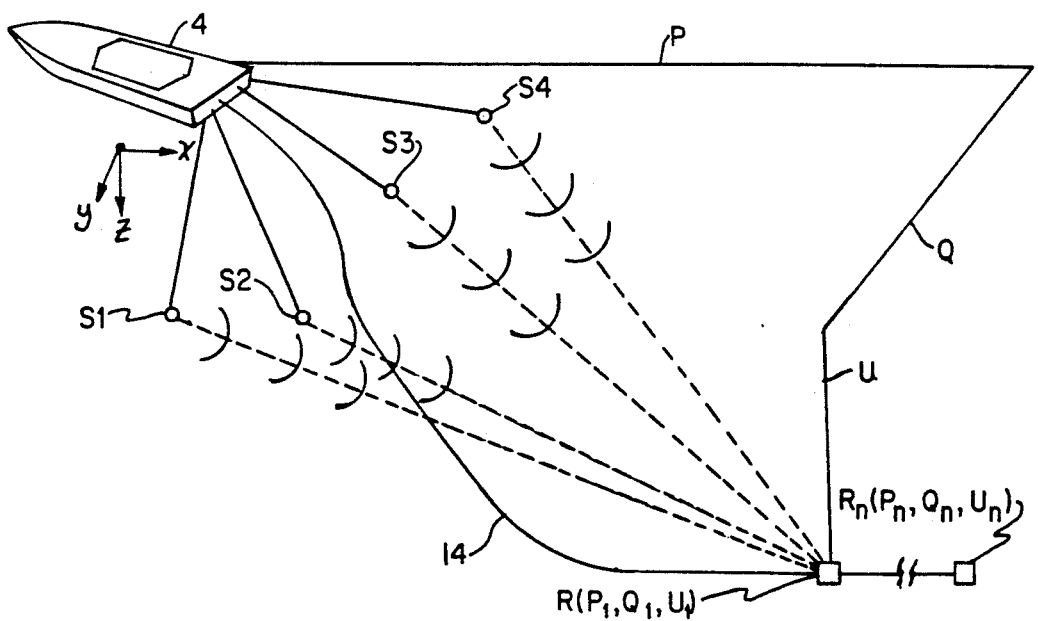
FIG. 6 represents another embodiment of the present invention.

Referring now to FIG. 6, vessel 4 now tows four sources identified as S1 through S4 and streamer cable 14 still has receivers R1 through $R_n$. It should be noted now that the cable is no longer being towed near the surface of the water but is at some unknown depth. Therefore, (P1,Q1,U1,), shown to be the location of receiver R1 in FIG. 6, is referenced to the known position of an (x,y,z) coordinate system as indicated on FIG. 6, P being the x coordinate, Q being the y coordinate and U being the z coordinate of receiver $R_s$.

The present invention as shown in FIG. 6 is capable of determining the location of the receivers R through $R_n$ in regards to their distances from vessel 4, not only in a horizontal direction but also the distance from the ship in a vertical direction as well. Three sources with corresponding three equations are necessary to define this concept. However, with more than three sources, four sources shown in FIG. 6, the acoustic velocity of water, V, can also be determined along with the location (P1,Q1,U1,) of receiver R1 When more than two sources are used in two dimensions and more than three sources are used in three dimensions, application of least squares methods can be applied to solve for the location of receiver R1 and/or water velocity V. Thus we may think of source S1 as being at a location A1, B1, and C1; source S2 as being at a location A2, B2, and C2; source S3 as being at a location A3, B3 and C3; and source S4 as being at a location A4, B4 and C4 with reference to the known (x,y,z) coordinate system. A general equation can now be written as:

$$(vt_i)^2 = (P-A_i)^2 + (Q-B_i)^2 + (R-C_i)^2, \text{ for } i=1,2,3,4 \quad (4)$$

substituting for i using 1,2,3 and 4; the process arrives at four equations which are used to determine the locations of each receiver R1 through $R_n$. In this regard it is not necessary to show a similar block diagram as FIG. 5. Suffice to say it would be obvious from a look at FIG. 5 that there would be four sources and four signals from the pulse code generator with four correlators and four max selectors.

What is claimed is:

1. A marine seismic system comprising:
    streamer cable means for being towed by a vessel in a body of water and including:
    a plurality of hydrophone means, located at predetermined positions in the streamer cable means, for receiving vibrations resulting from an occurrence of a seismic event in the water and providing signals corresponding to received vibrations, and
    a plurality of receiving means located at predetermined positions in the streamer cable means, receiver means being means for receiving acoustical signals provided by acoustical source means and providing electrical signals corresponding to received acoustical signals;
    source means including:
    event means for causing a seismic event to occur in the water, and
    a plurality of acoustical source means cooperating with the event means for providing acoustical signals in the water in a predetermined manner when the event means causes a seismic event so that the resulting received signals may be processed to identify the different acoustical source means; and
    signal processing means processing the signals from the hydrophones and the receiving means to provide seismic data related to an earth formation below the water.

2. A system as described in claim 1 in which the source means further comprises means for controlling each acoustical source means so as to cause each acoustical source means to provide a different encoded acoustical signal.

3. A system as described in claim 2 in which the controlling means is for controlling the plurality of acoustical source means so as to cause the plurality of acoustical source means to encode the acoustical signals in Galois sequence.

4. A system as described in claim 3 in which the processing means determines the distance to each receiver means so as to determine its location in the body of water utilizing the following equation:

$$(vt_i)^2 = (P-A_i)^2 + (Q-B_i)^2 \text{ for } i=\ldots n.$$

where n is the number of sources.

5. A system as described in claim 3 in which the signal processing means determines the location (P,Q,U) of each receiving means in accordance with the following equation:

$$(vt_i)^2 = (P-A_i)^2 + (Q-B_i)^2 + (U-C_i)^2, \text{ for } i=1,\ldots,n$$

where n is the number of sources, P is the coordinate of a receiving means along a first horizontal axis, Q is the coordinate along C a second horizontal axis perpendicular to the first axis and U is the coordinate along the vertical axis.

6. A method of using a marine seismic system comprising the steps of:
    towing a steamer cable means with a vessel in a body of water and including:
    locating a plurality of hydrophone means at predetermined positions in the streamer cable means,
    receiving vibrations with the plurality of hydrophones means, resulting from an occurrence of a seismic event in the water, with each hydrophone means providing a signal corresponding to received vibrations,
    locating a plurality of receiving means at predetermined positions in the streamer cable means, each receiver means being means for receiving acoustical signals providing by acoustical source means and providing an electrical signal corresponding to received acoustical signals,
    causing a seismic event to occur in the water with event means, and
    providing acoustical signals into the water with a plurality of acoustical source means, in cooperation with the event means when the event means causes a seismic event, in a predetermined manner so that resulting received acoustical signals may be processed to identify the different acoustical source means; and
    processing the signals from the hydrophones means and the receiving means with signal processing means to provide seismic data related to an earth formation below the water.

7. A method as described in claim 6 further comprising the step of controlling each acoustical source means so as to cause each acoustical source means to provide a different encoded acoustical signal.

8. A method as described in claim 7 in which the controlling step includes controlling the plurality of acoustical source means so as to cause the plurality of acoustical source means encode the acoustical signals in Galois sequence.

9. A method as described in claim 8 in which the processing step includes determining the distance to each receiver means so as to determine the receiver means location in the body of water utilizing the following equation:

$$(vt_i)^2 = (P-A_i)^2 + (Q-B_i)^2 \text{ for } i=1,2,$$

10. A method as described in claim 8 in which the processing step includes determining the location of each receiving means in accordance with the following equation:

$$(vt_i)^2 = (P-A_i)^2 + (Q-B_i)^2 + (U-C_i)^2, \text{ for } i=1,\ldots,n$$

where n is the number of sources, P is the coordinate of a receiving means along a first horizontal axis, Q is the coordinate along C a second horizontal axis perpendicular to the first axis and U is the coordinate along the vertical axis.

11. A marine cable locating system comprising:
streamer cable means for being towed by a vessel in a body of water and including:
a plurality of receiving means located at predetermined positions in the streamer cable means, each receiver means being means for receiving acoustical signals provided by acoustical source means and providing electrical signals corresponding to received acoustical signals;
source means including:
a plurality of acoustical source means for causing acoustical signals to occur in a predetermined manner in the water so that resulting received acoustical signals may be processed to identify the different acoustical source means; and
signal processing means processing the signals from the receiving means to provide data related to position of the streamer cable means.

12. A system as described in claim 11 in which the source means further comprises means for controlling each acoustical source means so as to cause each acoustical source means to provide a different encoded acoustical signal.

13. A system as described in claim 12 in which the controlling means is for controlling the plurality of acoustical source means so as to cause the plurality of acoustical source means to encode the acoustical signals in Galois sequence.

14. A system as described in claim 3 in which the processing means determines the distance to each receiver means so as to determine its location in the body of water utilizing the following equation:

$$(vt_i)^2 = (P-A_i)^2 + (Q-B_i)^2 \text{ for } i=\ldots n.$$

where n is the number of sources.

15. A system a described in claim 3 in which the signal processing means determines the location (P,Q,U) of each receiving means in accordance with the following equation:

$$(vt_i)^2 = (P-A_i)^2 + (Q-B_i)^2 + (U-C_i)^2, \text{ for } i=1,\ldots,n$$

where n is the number of sources, P is the coordinate of a receiving means along a first horizontal axis, Q is the coordinate along C a second horizontal axis perpendicular to the first axis and U is the coordinate along the vertical axis.

16. A method of locating the position of a marine cable comprising the steps of:
towing a streamer cable means with a vessel in a body of water and including:
locating a plurality of receiving means at predetermined positions in the streamer cable means, each receiving means being means for receiving acoustical signals providing by acoustical source means and providing an electrical signal corresponding to received acoustical signals;
providing acoustical signals into the water with a plurality of acoustical source means in a predetermined manner so that resulting received acoustical signals may be processed to identify the different acoustical source means; and
processing the signals from the receiving means with signal processing means to provide seismic data related to the position of the streamer cable means.

17. A method as described in claim 16 further comprising the step of controlling each acoustical source means so as to cause each acoustical source means to provide a different encoded acoustical signal.

18. A method as described in claim 17 in which the controlling step includes controlling the plurality of acoustical source means so as to cause the plurality of acoustical source means encode the acoustical signals in Galois sequence.

19. A method as described in claim 18 in which the processing step includes determining the distance to each receiver means so as to determine the receiver means location in the body of water utilizing the following equation:

$$(vt_i)^2 = (P-A_i)^2 + (Q-B_i)^2 \text{ for } i=1,2,$$

20. A method as described in claim 18 in which the processing step includes determining the location of each receiving means in accordance with the following equation:

$$(vt_i)^2 = (P-A_i)^2 + (Q-B_i)^2 + (U-C_i)^2, \text{ for } i=1,\ldots,n$$

where n is the number of sources, P is the coordinate of a receiving means along a first horizontal axis, Q is the coordinate along C a second horizontal axis perpendicular to the first axis and U is the coordinate along the vertical axis.

* * * * *